(12) United States Patent
Yamada et al.

(10) Patent No.: US 8,999,479 B2
(45) Date of Patent: Apr. 7, 2015

(54) HONEYCOMB STRUCTURE AND BONDED TYPE HONEYCOMB STRUCTURE

(75) Inventors: Toshio Yamada, Nagoya (JP); Kentaro Sugimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 474 days.

(21) Appl. No.: 12/717,157

(22) Filed: Mar. 4, 2010

(65) Prior Publication Data

US 2010/0247852 A1  Sep. 30, 2010

(30) Foreign Application Priority Data

Mar. 27, 2009  (JP) ................................ 2009-079068

(51) Int. Cl.
*B32B 3/12* (2006.01)
*B01D 46/24* (2006.01)

(52) U.S. Cl.
CPC ........ *B01D 46/2474* (2013.01); *B01D 46/2455* (2013.01); *B01D 46/247* (2013.01); *B01D 46/2459* (2013.01); *B01D 46/2466* (2013.01); *B01D 2046/2492* (2013.01)

(58) Field of Classification Search
None
See application file for complete search history.

(56) References Cited

U.S. PATENT DOCUMENTS

| | | | |
|---|---|---|---|
| 4,276,071 A | 6/1981 | Outland | |
| 7,326,270 B2 * | 2/2008 | Hong et al. | 55/523 |
| 8,038,757 B2 | 10/2011 | Bardon et al. | |
| 2004/0142145 A1 * | 7/2004 | Hashimoto et al. | 428/116 |
| 2005/0076627 A1 | 4/2005 | Itou et al. | |
| 2006/0019061 A1 * | 1/2006 | Oshimi | 428/116 |
| 2006/0191245 A1 | 8/2006 | Bardon | |
| 2006/0194018 A1 * | 8/2006 | Ohno et al. | 428/116 |
| 2009/0269548 A1 | 10/2009 | Mizutani | |

FOREIGN PATENT DOCUMENTS

| | | |
|---|---|---|
| EP | 1 422 390 A1 | 5/2004 |
| EP | 1 484 483 A1 | 12/2004 |
| EP | 1 502 640 A1 | 2/2005 |
| EP | 2 105 180 A1 | 9/2009 |
| JP | 56-124418 A1 | 9/1981 |
| JP | 2003-010616 A1 | 1/2003 |
| JP | 2004-000896 A1 | 1/2004 |
| JP | 2007-527482 A1 | 9/2007 |
| JP | 2008-510924 | 4/2008 |
| WO | 2008/126433 A1 | 10/2008 |

OTHER PUBLICATIONS

Japanese Office Action dated Aug. 14, 2012.
Japanese Office Action, Japanese Application No. 2009-079068, dated Dec. 11, 2012 (2 pages).

* cited by examiner

*Primary Examiner* — Mark Ruthkosky
*Assistant Examiner* — Daniel J Schleis
(74) *Attorney, Agent, or Firm* — Burr & Brown, PLLC

(57) ABSTRACT

A honeycomb structure includes a porous partition wall defining a plurality of cells serving as fluid passages, an outer peripheral wall located at the outermost periphery, a first cell having one end opened and the end plugged, and a second cell having the one end plugged and the other end opened. The first cells and the second cells are disposed alternately, and the area of the first cells is larger than that of the second cells in a cross section perpendicular to a center axis. The thickness of the partition wall that forms at least one cell from the outermost periphery in the outer peripheral section is 1.1 to 3.0 times the thickness of the partition wall in the center section.

5 Claims, 4 Drawing Sheets

HONEYCOMB STRUCTURE AND BONDED TYPE HONEYCOMB STRUCTURE

FIELD OF THE INVENTION

The present invention relates to a honeycomb structure and a bonded type honeycomb structure, and more specifically to a honeycomb structure and a bonded type honeycomb structure which are excellent in isostatic strength.

BACKGROUND OF THE INVENTION

In various industrial fields including chemical industry, electric power industry, and steel industry, a ceramic honeycomb structure excellent in heat resistance and corrosion resistance is adopted as a carrier or a filter for a catalytic device used for, for example, environmental protection and the recovery of specific materials. In recent years in particular, a honeycomb structure is actively used for a diesel particulate filter (DPF) to trap particulate matters (PM) discharged from a diesel engine or the like as a plugged honeycomb structure formed by alternately plugging the open frontal areas on both end faces of cells.

As such a DPF, a honeycomb structure formed so that, in a cross section perpendicular to the center axis, the area of first cells having one ends (the ends on the exhaust gas inlet side) opened and the other ends plugged may be larger than the area of second cells having one ends (the ends on the exhaust gas inlet side) plugged and the other ends opened in order to inhibit the clogging caused by particulate matters and increase the quantity of trapped particulate matters by increasing the surface area of the cells into which an exhaust gas flows is disclosed (refer to Patent Documents 1 and 2 for example).
[Patent Document 1] JP-A-2004-896
[Patent Document 2] JP-A-56-124418

SUMMARY OF THE INVENTION

Such a honeycomb structure can trap particulate matters in an exhaust gas in large quantity, but there has been a problem that isostatic strength is low since the cell structure is heterogeneous.

The present invention has been established in view of the above problem and an object of the present invention is to provide a honeycomb structure and a bonded type honeycomb structure which are excellent in isostatic strength.

In order to solve the above problem, the present invention provides the following honeycomb structure and bonded type honeycomb structure.

[1] A honeycomb structure comprising: a porous partition wall defining a plurality of cells serving as fluid passages; an outer peripheral wall located at the outermost periphery; a first cell having one end opened and the end plugged; and a second cell having the one end plugged and the other end opened, wherein: the first cells and the second cells are disposed alternately; and the area of the first cells is larger than that of the second cells in a cross section perpendicular to a center axis, and wherein in a cross section perpendicular to the center axis, when the region from a gravity center of an outer peripheral shape to a boundary formed by points at the middle of the distance between the gravity center and the outer periphery of the outer peripheral wall is defined as a center section and the region outside the center section is defined as an outer peripheral section, the thickness of the partition wall that forms at least one cell from the outermost periphery in the outer peripheral section is 1.1 to 3.0 times the thickness of the partition wall in the center section.

[2] The honeycomb structure according to Item [1], wherein the thickness of the partition wall that forms 20 cells or less from the outermost periphery in the outer peripheral section of the honeycomb structure is 1.1 to 3.0 times the thickness of the partition wall in the center section.

[3] A bonded type honeycomb structure comprising a plurality of the honeycomb structures according to Item [1] or [2], wherein the plurality of the honeycomb structures is disposed adjacently so that the side faces thereof face each other and the facing side faces are bonded together through bonding portions.

[4] The bonded type honeycomb structure according to Item [3], wherein, in the outer peripheral walls of the honeycomb structures, the portions conforming to the outer shape of the first cells are formed into a convex shape and the portions conforming to the outer shape of the second cells are formed into a concave shape.

According to a honeycomb structure of the present invention, since the thickness of the partition wall in the outer peripheral section is 1.1 to 3.0 times the thickness of the partition wall in the center section, it is possible to enhance isostatic strength. Further, it is also possible to enhance isostatic strength likewise in a bonded type honeycomb structure formed by bonding a plurality of honeycomb structures according to the present invention.

DETAILED DESCRIPTION OF THE INVENTION

Embodiments according to the present invention will be described below in detail with reference to the drawings but the present invention is not limited to the embodiments below and it should be understood that the present invention may arbitrarily be changed or modified in design within the range not deviating from the gist of the present invention on the basis of the ordinary knowledge of those skilled in the art.

(1) Honeycomb Structure

Figure 1:
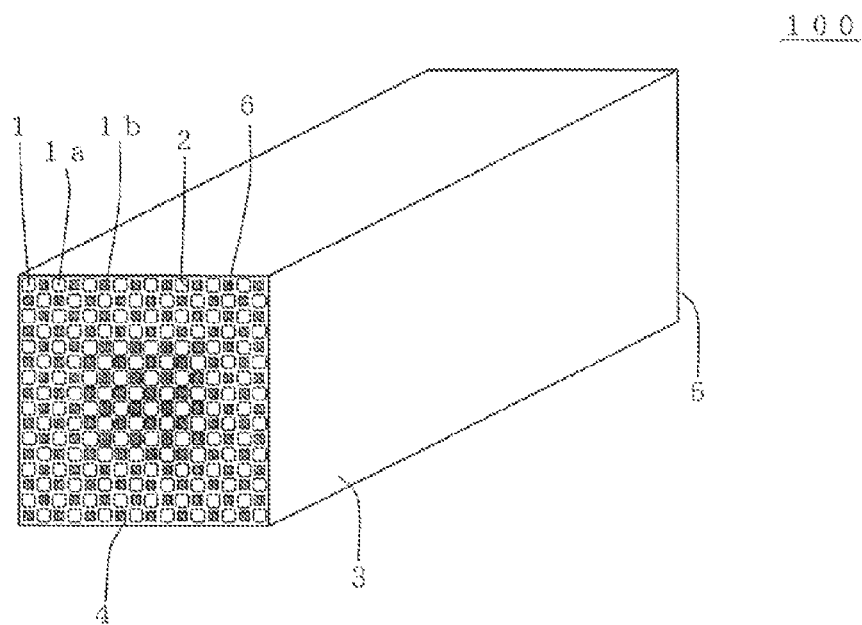
FIG. 1 is a perspective view schematically showing a honeycomb structure in an embodiment according to the present invention.
Figure 2:
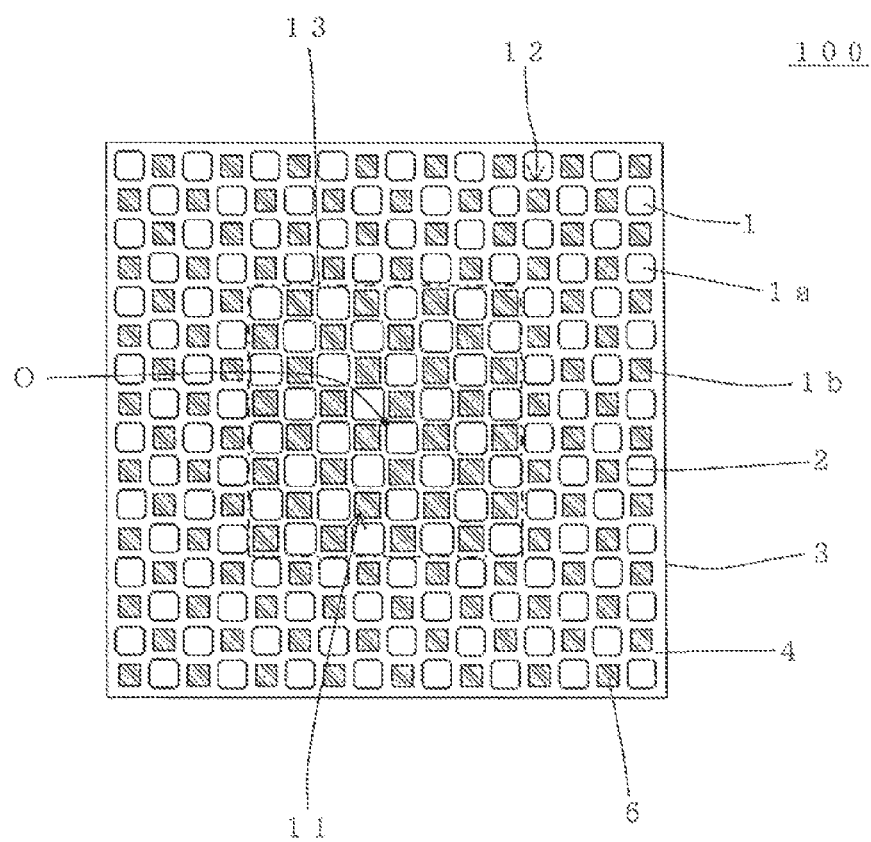
FIG. 2 is a plan view schematically showing one end face of a honeycomb structure in an embodiment according to the present invention.

In an embodiment of a honeycomb structure according to the present invention, as shown in FIGS. 1 and 2: the honeycomb structure has: a porous partition wall 2 defining a plurality of cells 1 serving as fluid passages; an outer peripheral wall 3 located at the outermost periphery; a first cell 1a having one end opened and the other end plugged; and a second cell 1b having the one end plugged and the other end opened, wherein: the first cells 1a and the second cells 1b are disposed alternately; and the area of the first cells 1a is larger than that of the second cells 1b in a cross section perpendicular to a center axis, and wherein in a cross section perpendicular to the center axis, when the region from a gravity center O of an outer peripheral shape to a boundary (13) formed by points at the middle of "the distance between the gravity center O and the outer periphery of the outer peripheral wall 3" is defined as a center section (a center region) 11 and the region outside the center section 11 (the region outside the boundary 13) is defined as an outer peripheral section (an outer peripheral region) 12, the thickness of the partition wall that forms at least one cell from the outermost periphery in the outer peripheral section 12 is 1.1 to 3.0 times the thickness of the partition wall in the center section 11. Since the thickness of the partition wall that forms at least one cell from the outermost periphery in the outer peripheral section 12 is 1.1 to 3.0 times the thickness of the partition wall in the center section 11 as stated above, it is possible to enhance the isostatic strength. FIG. 1 is a perspective view schematically showing a honeycomb structure in an embodiment according to the present invention. FIG. 2 is a plan view schematically showing one end face of a honeycomb structure in an embodiment according to the present invention.

In a honeycomb structure 100 according to the present embodiment, the thickness of the partition wall that forms at least one cell from the outermost periphery (toward the center) in the outer peripheral section is 1.1 to 3.0 times, preferably 1.4 to 2.3 times, the thickness of the partition wall in the center section. If the thickness of the partition wall in the outer peripheral section is less than 1.1 times the thickness of the partition wall in the center section, the isostatic strength is not so much enhanced. If the thickness of the partition wall in the outer peripheral section is more than 3.0 times the thickness of the partition wall in the center section, the pressure loss undesirably increases when an exhaust gas is purified. Further, it is preferable that the thickness of the partition wall that forms 20 cells or less from the outermost periphery (toward the center) in the outer peripheral section of the honeycomb structure be 1.1 to 3.0 times the thickness of the partition wall in the center section. Furthermore, the thick partition wall in the outer peripheral section (the partition wall having a thickness of 1.1 to 3.0 times that of the partition wall in the center section) may be either the whole partition wall constituting the outer peripheral section or a part of the partition wall constituting the outer peripheral section. When the thick partition wall in the outer peripheral section is a part of the partition wall constituting the outer peripheral section, the thickness of the other part of the partition wall constituting the outer peripheral section is not particularly limited but preferably be identical to the thickness of the partition wall in the center section. Here, when the number of cells is counted from the outermost periphery of a honeycomb structure, the number of cells is counted except the cells having imperfect shapes including a shape a part of which lacks in the outermost periphery by the influence of the outer peripheral shape of the honeycomb structure.

In the honeycomb structure according to the present embodiment, in a cross section perpendicular to the center axis, the area of the first cells 1a (the cross sectional area of the first cells) is larger than that of the second cells 1b (the cross sectional area of the second cells). Then, by introducing an exhaust gas from the open end side (one end side) of the first cells 1a, permeating the exhaust gas through the porous partition wall 2, and discharging the exhaust gas from the open end side (the other end side) of the second cells 1b, it is possible to: trap particulate matters in the exhaust gas on the surface of the partition wall 2 having a large surface area in the interior of the first cells 1a; and hence inhibit the inflow side cells from clogging by the particulate matters. Then, in a honeycomb segment constituting the honeycomb structure according to the present embodiment, the cross sectional area of the first cells be preferably 120% to 300%, yet preferably 140% to 250%, of the cross sectional area of the second cells. If the cross sectional area of the first cells is less than 120% of the cross sectional area of the second cells, the clogging inhibiting effect of the inflow side cells (the first cells) may deteriorate in some cases and, if the cross sectional area of the first cells is larger than 300% of the cross sectional area of the second cells in contrast, the cross sectional area of the outflow side cells (the second cells) decreases and hence pressure loss may increase in some cases. Here, one end of the first cell and one end of the second cell are both located on the side of one end face 4 of the honeycomb structure 100 and the other end of the first cell and the other end of the second cell are both located on the side of the other end face 5 of the honeycomb structure 100.

Further, in the honeycomb structure 100 according to the present embodiment, it is preferable that, in a cross section perpendicular to the center axis, the width W1 of the first cells (refer to FIG. 5) be in the range of 0.8 to 3 mm and the width W2 of the second cells (refer to FIG. 5) be in the range of 0.7 to 2.8 mm.

The material for the honeycomb structure (the material for the partition wall and the outer peripheral wall) according to the present embodiment is preferably ceramics and, from the viewpoint of being excellent in strength and heat resistance, yet preferably at least one kind selected from the group of silicon carbide, silicon-silicon carbide-based composite material, cordierite, mullite, alumina, spinel, silicon carbide-cordierite based composite material, lithium aluminum silicate, aluminum titanate, and iron-chrome-aluminum based alloy. Among those materials, silicon carbide or silicon-silicon carbide-based composite material is particularly preferably used.

It is preferable that the honeycomb structure (the partition wall and the outer peripheral wall) according to the present embodiment be porous. The porosity of the honeycomb structure is in the range of 30% to 80%, and preferably in the range of 40% to 65%. By controlling the porosity in the range, it is possible to reduce the pressure loss while maintaining the strength. If the porosity is less than 30%, the pressure loss may increase in some cases. If the porosity exceeds 80%, the strength may lower and the thermal conductivity may deteriorate in some cases. A porosity is a value measured with a mercury porosimeter.

In the honeycomb structure (the partition wall and the outer peripheral wall) according to the present embodiment, the average pore diameter is preferably in the range of 5 to 50 μm, and yet preferably in the range of 7 to 35 μm. By controlling the average pore diameter in the range, it is possible to trap particulate matters (PM) effectively. If the average pore diameter is less than 5 μm, clogging caused by particulate matters (PM) may tend to occur in some cases. If the average pore diameter exceeds 50 μm, particulate matters (PM) may not be trapped by a filter and may pass through in some cases. An average pore diameter is a value measured with a mercury porosimeter.

Meanwhile, the cell compactness of the honeycomb structure is not particularly limited but is preferably in the range of 0.9 to 311 cells/cm$^2$, and yet preferably in the range of 7.8 to 62 cells/cm$^2$.

The shape of a cell (the shape of a cell in a cross section perpendicular to the center axis direction (the cell extending direction) of the honeycomb structure) in the honeycomb structure according to the present embodiment: is not particularly limited; and, in any of the first cells and the second cells, may be a triangle, a quadrangle, a hexagon, an octagon, a circle, or a combination thereof for example. Among those examples, it is preferable that the shape of the first cells $1a$ having a larger cross sectional area be an octagon and the shape of the second cells $1b$ having a smaller cross sectional area be a quadrangle as shown in FIG. 2. Otherwise, it is also preferable that the shape of the first cells be a quadrangle, having the corners formed in a round shape thereof and the shape of the second cells be a quadrangle.

The size of the honeycomb structure according to the present embodiment is not particularly limited but, in the case of a tubular shape having a square-shaped bottom for example, the length of each side of the bottom is preferably in the range of 15 to 450 mm, and yet preferably in the range of 25 to 350 mm. Further, the length in the direction of the center axis of the honeycomb structure is preferably in the range of 50 to 450 mm, and yet preferably in the range of 100 to 350 mm.

In the honeycomb structure according to the present embodiment, as shown in FIGS. 1 and 2, the honeycomb structure has plugged portions at one end of the second cell and at the other end of the first cell in the honeycomb segment and the first cells and the second cells are disposed alternately in the manner of forming a checked pattern on the end faces of the honeycomb segment. Further in the same way as a bonded type honeycomb structure to be described below, it is also possible to, after firing: cut the outer peripheral portion to form an intended shape; and thereafter form an outer peripheral coated portion.

Figure 3:
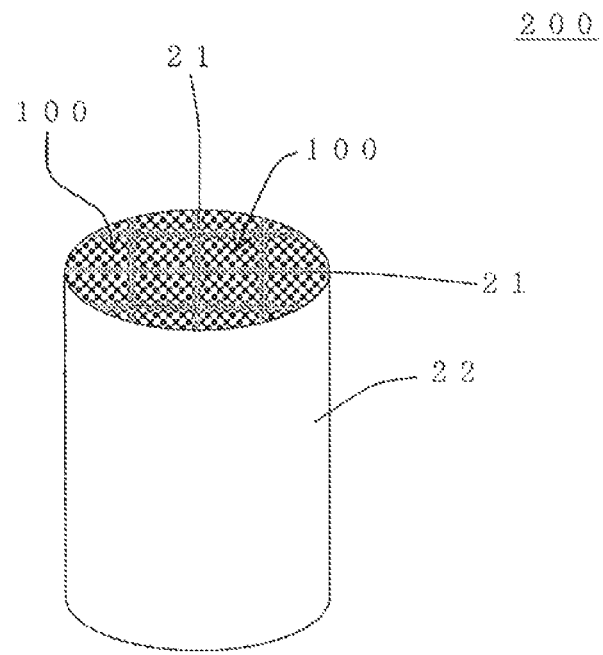
FIG. 3 is a perspective view schematically showing a bonded type honeycomb structure in an embodiment according to the present invention.

(2) Bonded Type Honeycomb Structure (2-1) An Embodiment of a Bonded Type Honeycomb Structure In an embodiment of a bonded type honeycomb structure according to the present invention: the bonded type honeycomb structure has a plurality of honeycomb structures (the honeycomb structures 100) according to an embodiment of the present invention; and the plural honeycomb structures 100 are disposed adjacently so that the side faces thereof may face each other and the facing side faces are bonded together through bonding portions 21. A bonded type honeycomb structure 200 according to the present embodiment: is formed by bonding a plurality of honeycomb structures 100 through bonding portions 21 as stated above; and hence is excellent in thermal shock resistance. FIG. 3 is a perspective view schematically showing a bonded type honeycomb structure in an embodiment according to the present invention.

Further, in a cross section perpendicular to the center axis direction of the bonded type honeycomb structure according to the present embodiment, the number of disposed honeycomb structures is preferably in the range of 4 to 144, and yet preferably in the range of 16 to 100. The size of a honeycomb structure constituting the bonded type honeycomb structure is preferably in the range of 3 to 16 cm$^2$, and yet preferably in the range of 7 to 13 cm$^2$, in terms of an area in a cross section perpendicular to the center axis. If the size of a honeycomb structure is smaller than 3 cm$^2$, pressure loss may increase sometimes when a gas passes through the honeycomb structure and, if it exceeds 16 cm$^2$, the effect of inhibiting the honeycomb structure from breaking may decrease sometimes.

The bonding portions 21 constituting the bonded type honeycomb structure 200 according to the present embodiment are disposed between adjacent honeycomb structures 100 and the honeycomb structures 100 are bonded together through the bonding portions 21. It is preferable that the bonding portions 21 be disposed on the whole side faces facing each other of the adjacent honeycomb structures 100. The material for the bonding portions 21 is preferably slurry or the like produced by: adding additives such as an organic binder, a foamed resin, and a dispersant to an inorganic material such as inorganic fiber, colloidal silica, kneaded clay, or SiC particles; further adding water thereto; and kneading the mixture.

It is preferable that the bonded type honeycomb structure according to the present embodiment has an outer peripheral coated portion 22 formed so as to surround all the plural honeycomb structures 100 as shown in FIG. 3. By forming the outer peripheral coated portion 22, the effect of improving the circularity of the outer shape is exhibited. The thickness of the outer peripheral coated portion 22 in the bonded type honeycomb structure according to the present embodiment is preferably in the range of 0.1 to 4.0 mm, and yet preferably in the range of 0.3 to 1.0 mm. If the thickness is less than 0.1 mm, cracks may tend to appear sometimes when the outer peripheral coating is applied. If the thickness exceeds 4.0 mm, pressure may increase sometimes. The thickness of an outer peripheral coated portion is represented by the distance between the outer peripheral surface of the outer peripheral coated portion and a cell located closest to the outer peripheral coated portion.

The whole shape of the bonded type honeycomb structure according to the present embodiment is not particularly limited and may take a desired shape such as a cylindrical shape or an oval shape, for example. Further, the whole size of the bonded type honeycomb structure is, in the case of a cylindrical shape for example, preferably in the range of 50 to 450 mm, and yet preferably in the range of 100 to 350 mm, in terms of the diameter of the bottom. Furthermore, the length of the bonded type honeycomb structure in the center axis direction is preferably in the range of 50 to 450 mm, and yet preferably in the range of 100 to 350 mm.

(2-2) Another Embodiment of a Bonded Type Honeycomb Structure

Figure 4A:
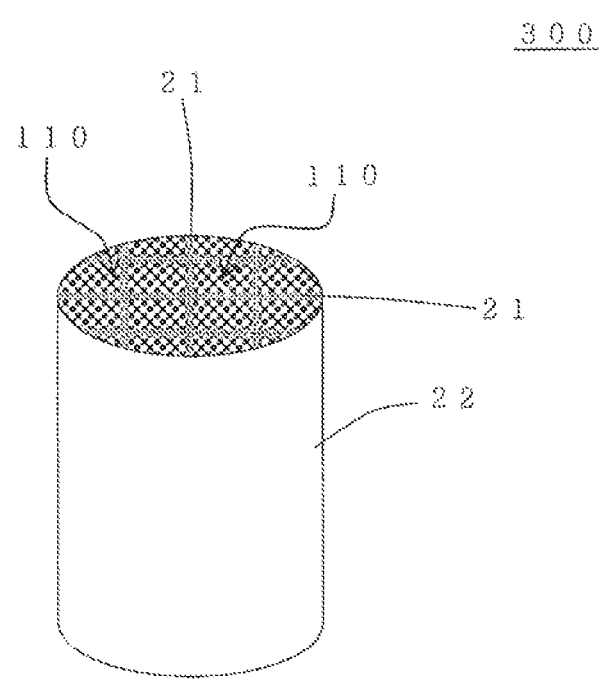
FIG. 4A is a perspective view schematically showing a bonded type honeycomb structure in another embodiment according to the present invention.
Figure 4B:
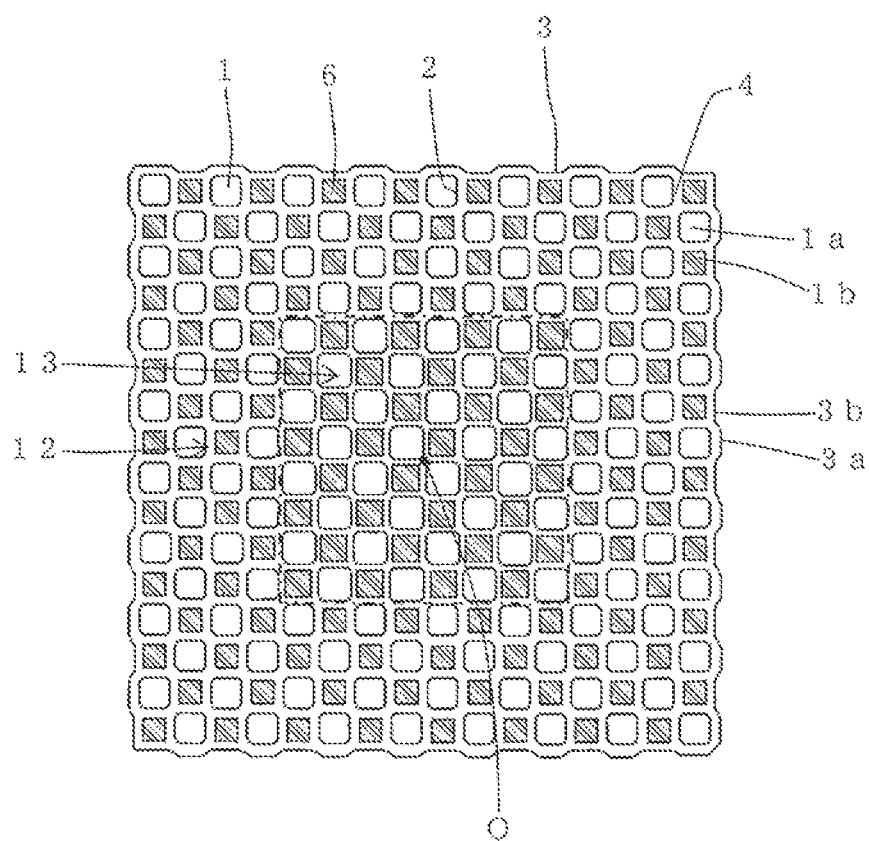
FIG. 4B is a plan view schematically showing one end face of a honeycomb structure constituting a bonded type honeycomb structure in another embodiment according to the present invention.
Figure 5:
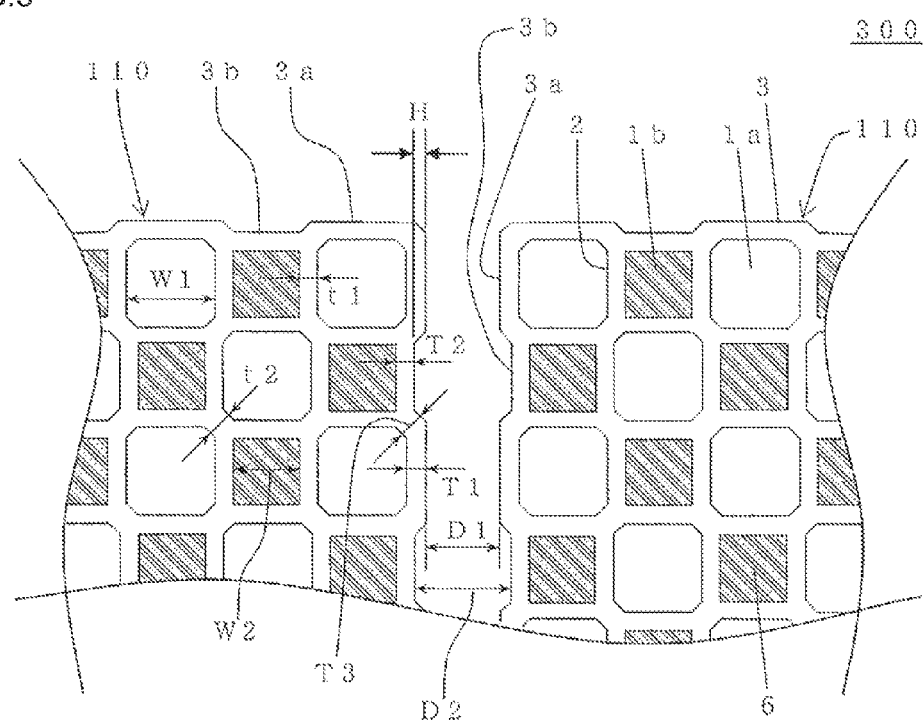
FIG. 5 is a plan view schematically showing a part of one end face a bonded type honeycomb structure in another embodiment according to the present invention.

In another embodiment of a bonded type honeycomb structure according to the present invention, as shown in FIGS. 4A, 4B and 5, in the outer peripheral walls 3 of honeycomb structures (the honeycomb structures 110) according to the present invention, the portions (the convex portions $3a$) conforming to the outer shape of the first cells $1a$ are formed into a convex shape and the portions (the concave portions $3b$) conforming to the outer shape of the second cells $1b$ are formed into a concave shape. The other configuration is the same as that of the bonded type honeycomb structure in the above embodiment according to the present invention. FIG. 4A is a perspective view schematically showing a bonded type honeycomb structure in another embodiment according to the present invention. FIG. 4B is a plan view schematically showing one end face of a honeycomb structure constituting the bonded type honeycomb structure in another embodiment according to the present invention. FIG. 5 is a plan view schematically showing a part of one end face of the bonded type honeycomb structure in another embodiment according to the present invention. Here in FIG. 5, the bonding portions are omitted.

Since a bonded type honeycomb structure 300 according to the present embodiment is configured as stated above, the contact area between the honeycomb structures 110 and bonding portions increases and it is possible to prevent the honeycomb structures from exfoliating from the bonding portions when operations for burning trapped particulate matters (regeneration) are repeated.

In the bonded type honeycomb structure 300 according to the present embodiment, it is preferable that the height H (refer to FIG. 5) of the portions formed into a convex shape (the convex portions 3a) of an outer peripheral wall 3 be in the range of 0.1 to 1.0 mm with respect to the portions formed into a concave shape (the concave portions 3b) of the outer peripheral wall 3 in a honeycomb structure 110. By controlling the height H of the convex portions 3a in the range, it is possible to further enhance the bonding strength between the honeycomb structures 110 and the bonding portions. If the height H of the convex portions 3a is lower than 0.1 mm, the effect of enhancing the bonding strength between the honeycomb structures 110 and the bonding portions may deteriorate in some cases and, if the height H of the convex portions 3a is higher than 1.0 mm, special attention paid to the deformation and the like of the honeycomb structures is required during forming and firing and hence productivity may deteriorate in some cases.

Further in the bonded type honeycomb structure 300 according to the present embodiment, it is preferable that, in a pair of outer peripheral walls facing each other of adjacent honeycomb structures, the distance D2 between a portion formed into a concave shape (a concave portion) on one outer peripheral wall and a portion formed into a concave shape (a concave portion) on the other outer peripheral wall (the distance between the concave portions 3b and 3b) be in the range of 0.3 to 3.0 mm. If D2 is shorter than 0.3 mm, when the bonded type honeycomb structure 300 is constructed by assembling the plural honeycomb structures 110, the thickness of the bonding material is hardly controlled and hence productivity may deteriorate in some cases. If D2 is longer than 3.0 mm, when the bonded type honeycomb structure 300 is constructed by assembling the plural honeycomb structures 110, the thickness of the bonding material is hardly controlled and hence productivity may deteriorate in some cases and in addition pressure loss may tend to increase in some cases. "The distance D2 between a portion formed into a concave shape on one outer peripheral wall and a portion formed into a concave shape on the other outer peripheral wall" means the length of a perpendicular drawn from a portion formed into a concave shape on one outer peripheral wall to a portion formed into a concave shape on the other outer peripheral wall. Consequently, in the case where a portion formed into a concave shape on one outer peripheral wall and a portion formed into a concave shape on the other outer peripheral wall do not face each other and are allocated in a biased manner, the distance D2 is the length of a perpendicular drawn from a portion formed into a concave shape on the other outer peripheral wall to the extended line of a portion formed into a concave shape on one outer peripheral wall.

Furthermore, in the bonded type honeycomb structure 300 according to the present embodiment, it is preferable that, in a pair of outer peripheral walls 3 and 3 facing each other in adjacent honeycomb structures 110, the distance D1 between convex portions 3a and 3a be in the range of 0.1 to 1.0 mm. If the distance D1 between convex portions 3a and 3a is shorter than 0.1 mm, the bonding portions may deform due to stress at regeneration and the outer peripheral walls may collide with each other in some cases and, if the distance D1 is longer than 1.0 mm, pressure loss may increase sometimes when an exhaust gas is introduced into the honeycomb structures. "The distance between convex portions 3a and 3a" means the length of a perpendicular drawn from a convex portion on one outer peripheral wall to a convex portion on the other outer peripheral wall. In addition, the distance D2 between concave portions 3b and 3b is a value obtained by adding twice of H to D1.

In the bonded type honeycomb structure 300 according to the present embodiment, as shown in FIG. 5, in adjacent honeycomb structures 110, convex portions face each other and also concave portions face each other. In a bonded type honeycomb structure according to the present invention, it is preferable that convex portions face each other and also concave portions face each other in adjacent honeycomb structures 110 as stated above but it is also preferable that a convex portion 3a and a concave portion 3b be formed so as to face each other in adjacent honeycomb structures 110.

Further, the thickness t1 of the partition wall (the partition wall thickness) located between the first cells and the second cells (refer to FIG. 5) is preferably not more than the thickness t2 of the oblique partition wall (refer to FIG. 5), and yet preferably less than t2. "The oblique partition wall": is, as shown in FIG. 5, in a cross section perpendicular to the center axis of the honeycomb structures 110, a partition wall extending in a direction inclining from the direction where the first cells and the second cells are aligned alternately; is located on the extended line of the diagonal line of a second cell; and is a partition wall extending in the direction where the diagonal line is extended. In the honeycomb structures shown in FIG. 5, the oblique partition wall extends in the direction inclined by 45° from the direction where the first cells and the second cells are aligned alternately. The partition wall thickness t1 is preferably in the range of 0.075 to 1.5 mm. Further, the thickness t2 of the oblique partition wall is preferably in the range of 0.09 to 1.6 mm.

Further, the thickness T1 of the partition wall of the convex portions 3a (the outer peripheral wall) is preferably not less than the partition wall thickness t1, and yet preferably more than t1. Further, the thickness T2 of the partition wall of the concave portions 3b (the outer peripheral wall) is preferably not less than the partition wall thickness t1, and yet preferably more than t1. Furthermore, the thickness T3 of the oblique outer peripheral partition wall is preferably not less than the thickness t2 of the oblique partition wall, and yet preferably more than t2. "The oblique outer peripheral partition wall" is, as shown in FIG. 5, in a cross section perpendicular to the center axis of the honeycomb structures 110, a partition wall being a part of the outer peripheral wall 3 and extending in the direction inclining from the direction where the first cells and the second cells are aligned alternately. In other words, that is a partition wall that is a part of the outer peripheral wall 3 and connects the partition wall of the convex portions 3a (the outer peripheral wall) to the partition wall of the concave portions 3b (the outer peripheral wall) obliquely (in the manner of inclining from the direction where the partition wall of the convex portions 3a and the partition wall of the concave portions 3b extend). The partition wall thickness T1 of the convex partitions 3a is preferably in the range of 0.2 to 1.5 mm. Further, the partition wall thickness T2 of the concave portions 3b is preferably in the range of 0.2 to 1.5 mm. Further, the thickness T3 of the oblique outer peripheral partition wall is preferably in the range of 0.2 to 1.5 mm.

(3) Manufacturing Method of Honeycomb Structure

Successively, the manufacturing method of a honeycomb structure according to an embodiment of the present invention will be described.

Firstly, a forming material is prepared by adding a binder, a surface activating agent, a pore-forming material, water, and others to a raw ceramic material. The raw ceramic material is preferably at least one kind selected from the group of silicon carbide, silicon-silicon carbide-based composite material, cordierite, mullite, alumina, spinel, silicon carbide-cordierite based composite material, lithium aluminum silicate, aluminum titanate, and iron-chrome-aluminum based alloy. Among those materials, silicon carbide or silicon-silicon carbide-based composite material is preferably used. When the silicon-silicon carbide-based composite material is used, a mixture of silicon carbide powder and metallic silicon powder is used as the raw ceramic material. It is preferable that the content of the raw ceramic material account for 30 to 90 mass % of the whole forming material.

When the raw ceramic material is silicon carbide, the average grain size of silicon carbide particles is preferably in the range of 5 to 100 μm. The advantage obtained by controlling the average grain size in the range is that a filter can easily be controlled so as to have preferred porosity and pore diameter. If the average grain size is smaller than 5 μm, the pore diameter decreases excessively and, if it exceeds 100 μm, the porosity increases excessively. If the pore diameter is too small, clogging caused by particulate matters (PM) tends to occur in some cases and, if the porosity is too large, pressure loss may increase in some cases. The average grain size of the raw material is a value measured in accordance with JIS R 1629.

As the binder, methyl cellulose, hydroxypropoxyl cellulose, hydroxyethyl cellulose, carboxymethyl cellulose, polyvinyl alcohol, and others can be named. Among those, it is preferable to use methyl cellulose and hydroxypropoxyl cellulose in combination. It is preferable that the content of the binder account for 2 to 20% by mass of the whole forming material.

It is preferable that the content of water account for 5 to 50 mass % of the whole forming material.

As the surface activating agent, ethylene glycol, dextrin, fatty acid soap, polyalcohol, or the like can be used. They may be used separately or with a combination of two or more kinds. It is preferable that the content of the surface activating agent account for 0 to 5 mass % of the whole forming material.

The pore-forming material is not particularly limited as long as the material can form pores after it is fired and starch, foamed resin, water-absorbent resin, silica gel, and the like can be named as the examples. It is preferable that the content of the pore-forming material account for 0 to 20 mass % of the whole forming material.

Successively, kneaded clay is formed by mixing and kneading the forming material. The method for forming kneaded clay by mixing and kneading the forming material is not particularly limited and a method of using a kneader, a vacuum auger machine, or the like can be named as an example.

Successively, the kneaded clay is extrusion-formed to form a honeycomb formed body having such a shape as the honeycomb structure (excluding plugged portions) shown in FIG. 4B. On the occasion of the extrusion-forming, it is preferable to use a die having a desired cell shape, partition wall thickness, cell compactness, and the like. As the material of the die, hardly abradable cemented carbide is preferably used. The honeycomb formed body: has a porous partition wall to separate and form a plurality of cells serving as fluid passages and an outer peripheral wall located at the outermost periphery; and is configured so that, in a cross section perpendicular to the center axis direction, first cells having a larger area and second cells having a smaller area may be disposed alternately and the portions of the outer peripheral wall conforming to the outer shape of the first cells (the convex portions) may be formed into a convex shape and the portions thereof conforming to the outer shape of the second cells (the concave portions) may be formed into a concave shape. Otherwise, a honeycomb structure having a planar outer periphery and a quadrangular bottom as shown in FIGS. 1 and 2 may also be adopted. It goes without saying that the shape of the bottom may be either cylindrical or elliptical.

The partition wall thickness, the cell compactness, the outer peripheral wall thickness, and others of a honeycomb formed body can appropriately be decided in consideration of contraction in drying and firing and also in conformity with the configuration of a honeycomb structure to be produced in the present invention.

It is preferable to dry the obtained honeycomb formed body before it is fired. The method of drying is not particularly limited and electromagnetic heating methods such as microwave heat drying and high-frequency dielectric heat drying and external heating methods such as hot-air drying and overheated water vapor drying can be named as the examples. Among those methods, from the viewpoint of being able to dry the whole formed body rapidly and uniformly without causing cracking, it is preferable to vaporize a certain quantity of moisture by an electromagnetic heating method and thereafter vaporize the remaining moisture by an external heating method. As the condition of the drying, it is preferable to remove moisture 30 to 90% by mass of the moisture contained before the drying by an electromagnetic heating method and thereafter reduce the moisture to 3% by mass or less by an external heating method. The dielectric heat drying is preferably used as the electromagnetic heating method and the hot-air drying is preferably used as the external heating method.

Successively, when the length of the honeycomb formed body in the center axis direction is not a desired length, it is preferable to cut both the end faces (both the ends) and obtain a desired length. The method of cutting is not particularly limited and a method of using a circular saw cutting machine or the like can be named.

Successively, it is preferable to produce a honeycomb fired body by firing the honeycomb formed body. It is preferable to apply calcination in order to remove a binder or the like before the firing. It is preferable to apply the calcination for 0.5 to 20 hours at 400° C. to 500° C. in the atmosphere. The methods of calcinating and firing are not particularly limited and it is possible to use an electric furnace, a gas furnace, or the like. As the firing condition, it is preferable to apply heating for 1 to 20 hours at 1,300° C. to 1,500° C. in an inert atmosphere of nitrogen, argon, or the like.

Successively, in the obtained honeycomb fired body, it is preferable to: plug the ends on one side of the second cells having smaller area in a cross section perpendicular to the center axis and the ends on the other side of the first cells having larger area in the cross section perpendicular to the center axis (form plugged portions); and produce a plugged honeycomb fired body. The method for forming the plugged portions is not particularly limited and the following method can be named as an example. A sheet is attached to the end face on one side of a honeycomb fired body and thereafter holes are formed at the positions of the sheet corresponding to the cells (the second cells) at which plugged portions are to be formed. Then the end face of the honeycomb fired body to which the sheet is attached is dipped in slurry for plugging comprising materials constituting the plugged portions and the interior of the opening end of the cells (the second cells) at which the plugged portions are to be formed is filled with the slurry for plugging through the holes formed in the sheet. Then with regard to the end face on the other side of the honeycomb fired body, plugged portions are formed at the other end face of the cells (the first cells) to which plugging is not applied at the end face on one side thereof by the same method as used for forming the plugged portions at the end face on one side (filled with the slurry for plugging). As the materials constituting the plugging portions, the same materials as a honeycomb formed body are preferably used. It is preferable to apply firing under the same conditions as the above firing conditions after the plugged portions are formed. Otherwise it is also possible to form the plugged portions before the honeycomb formed body is fired.

It is preferable then to: dry and fire the plugged portions by drying and firing the obtained plugged honeycomb fired body; and thereby obtain a honeycomb structure. It is preferable that the conditions for drying and firing the plugged honeycomb fired body be the same as the conditions for drying and firing the aforementioned honeycomb formed body. It is also preferable that the conditions such as the partition wall thickness and others of the obtained honeycomb structure be the same as the conditions such as the partition wall thickness and others of the honeycomb structure according to the aforementioned embodiment of the present invention.

(4) Manufacturing Method of Bonded Type Honeycomb Structure

Successively the manufacturing method of a bonded type honeycomb structure according to an embodiment will be described.

A plurality of honeycomb structures is produced by the aforementioned method of manufacturing a honeycomb structure. Then a prescribed number of the honeycomb structures are bonded with a bonding material and thereby a honeycomb segment bonded body wherein the plural honeycomb structures are disposed adjacently so that the side faces thereof may face each other and the facing side faces may be bonded at bonding portions is formed. The honeycomb segment bonded body may be used as a finally obtained bonded type honeycomb structure as it is. Here, in the case where a bonded type honeycomb structure according to another embodiment of the present invention (the bonded type honeycomb structure 300) as shown in FIGS. 4A, 4B and 5 is produced, it is preferable to use a die having a shape that allows a honeycomb formed body having such a shape as the honeycomb structure 100 (excluding plugged portions) shown in FIG. 4B to be obtained when each of the honeycomb structures is produced.

It is preferable that the bonding portions be disposed over the whole side faces facing each other. The bonding portions play not only the role of buffering (absorbing) volume change caused by the thermal expansion or the thermal contraction of the honeycomb segments but also the role of bonding the honeycomb segments.

The method for coating the side faces of the honeycomb segments with a bonding material is not particularly limited and a brush painting method or the like can be used.

As the bonding material, slurry or the like produced by: adding additives such as an organic binder, a foamed resin, and a dispersant to an inorganic material such as inorganic fiber, colloidal silica, kneaded clay, or SiC particles; further adding water thereto; and kneading the mixture can be named.

Successively, it is preferable to cut the outer peripheral portion of the honeycomb segment bonded body and obtain a desired shape. Thereafter, it is preferable to apply outer periphery coating treatment and obtain a bonded type honeycomb structure having an outer peripheral coated portion disposed at the outermost periphery.

As the outer periphery coating treatment, a method for coating the outermost periphery of a honeycomb segment bonded body with an outer periphery coating material and drying the honeycomb segment bonded body can be named. As the outer periphery coating material, a mixture of inorganic fiber, colloidal silica, kneaded clay, SiC particles, an organic binder, a foamed resin, a dispersant, water, and others can be used. The content of each material is preferably in the range similar to the preferable range of the content of the relevant material stipulated in the aforementioned bonding material. Further, the method for applying the outer periphery coating material is not particularly limited and the method of applying coating with a rubber spatula or the like while a honeycomb structure is rotated on a lathe can be named.

When a bonded type honeycomb structure 200 shown in FIG. 3 is produced for example, the bonded type honeycomb structure 200 is produced by: producing a honeycomb segment bonded body by bonding sixteen honeycomb structures having the shape of a quadrangular prism; producing a columnar honeycomb segment bonded body by cutting the outer periphery of the honeycomb segment bonded body; and forming an outer peripheral coated portion.

EXAMPLES

The present invention will be described below more concretely with reference to examples but is not limited to the examples at all.

Example 1

As the raw ceramic material: SiC powder and metallic Si powder were mixed at a mass ratio of 80:20; methyl cellulose and hydroxypropoxymethyl cellulose as auxiliary forming materials, starch and water-absorbent resin as pore-forming materials, a surface activating agent, and water were added thereto; and the materials were mixed and kneaded. Then, kneaded clay having the shape of a quadrangular prism was produced with a vacuum auger machine.

The obtained kneaded clay of the quadrangular prism shape was formed with an extruder into a honeycomb formed body wherein: the honeycomb formed body has a porous partition wall 2 to separate and form a plurality of cells serving as fluid passages and an outer peripheral wall located at the outermost periphery; first cells having larger areas and second cells having smaller areas are disposed alternately in a cross section perpendicular to the center axis direction; and the outer peripheral wall has a planar shape. The obtained honeycomb formed body was dried by high-frequency dielectric heating and thereafter dried for 2 hours at 120° C. with a hot-air dryer, and a prescribed quantity was cut out from both the ends.

The obtained honeycomb formed body was dried for 5 hours at 120° C. with a hot-air dryer, thereafter degreased for 5 hours at about 450° C. in the atmosphere in an air atmosphere furnace with a deodorizer, and thereafter fired for 5 hours at about 1,450° C. in an Ar inert gas atmosphere, and thus a porous honeycomb fired body wherein SiC crystal grains are bonded with Si was obtained. The average pore diameter of the honeycomb fired body was 13 μm and the porosity was 41%. The average pore diameter and the porosity are values measured with a mercury porosimeter.

With regard to the obtained honeycomb fired body, the plugged portions were formed at one end of the second cell and the other end of the first cell. As the filler for plugging, the material similar to the material used for the honeycomb formed body was used. After the plugged portions were formed in the honeycomb fired body, the honeycomb fired body was fired under the conditions identical to the above firing conditions and the honeycomb structure was obtained. With regard to the obtained honeycomb structure, the bottom was square and the length of one side thereof was 144 mm and the length in the central axis direction was 155 mm. Further, in the center section, the width W1 of the first cells was 1.24 mm, the width W2 of the second cells was 0.92 mm, and the sectional area of the first cells was 1.75 times the sectional area of the second cells. Furthermore, the partition wall thickness t in the center section was 0.38 mm and the partition wall thickness T of a cell in the outer peripheral section was 0.418 mm. Here, the thickness of the partition wall the thickness of which is not increased in the outer peripheral section was identical to the partition wall thickness in the center section. Here, "the partition wall thickness T of a cell in the outer peripheral section" means the thickness of the partition wall forming a perfect cell located at the outermost periphery of a honeycomb structure. Here, a perfect cell means not an imperfect cell a part of the shape of which lacks due to the influence of the outer peripheral shape of a honeycomb structure but a cell the shape of which is perfectly maintained in the outer peripheral section. It is possible to increase the partition wall thickness as stated above by changing the configuration of a die in extrusion, more specifically changing the width of the slit through which the kneaded clay is extruded.

With regard to the obtained honeycomb structure, "isostatic strength (isostrength)", "pressure loss", and "regeneration threshold value" were evaluated by the following methods. The results are shown in Table 1. In the columns of "isostatic strength", "regeneration threshold value", and "pressure loss" in Table 1, the values in Examples 1 to 23 and Comparative example 2 are shown as the difference from the values obtained in Comparative example 1 that is used as the base level and the values in Examples 24 to 28 are shown as the difference from the values obtained in Comparative example 3 that is used as the base level. Then the values in Examples 29 to 33 are shown as the difference from the values obtained in Comparative example 4 that is used as the base level.

(Isostatic Strength)

An isostatic strength was measured in conformity with the method for measuring isostatic fracture strength stipulated in JASO Standard M505-87 as the automotive standard published by Society of Automotive Engineers of Japan.

(Pressure Loss)

The pressure loss of a honeycomb structure was measured with a "filter pressure loss measuring device" described in JP-A-2005-172652. As the measurement conditions, the flow rate of fluid was set at 10 Nm$^3$/min. and the test temperature was set at 25° C.

(Regeneration Threshold Value)

A limit at which cracking occurs is identified by using a honeycomb structure as a DPF, increasing the quantity of accumulated soot sequentially, and applying regeneration (combusting the soot). Firstly the outer periphery of an obtained honeycomb structure is wrapped with a thermally nonexpansive ceramic mat as a holding material and a canning structure is obtained by pushing the wrapped honeycomb structure into a can body for canning made of SUS409. Thereafter, the soot is accumulated in the honeycomb structure by introducing a combustion gas containing soot generated by combusting diesel fuel (light oil) from the end face of the honeycomb structure on the side where the first cells are open (the end face on one side) and exhausting the combustion gas from the end face on the other side. Then after the honeycomb structure is cooled once to the room temperature, the soot is combusted rapidly by introducing a combustion gas containing oxygen of a prescribed proportion at 680° C. from the one end face of the honeycomb structure and reducing the flow rate of the combustion gas when the pressure loss of the honeycomb structure lowers and thereafter whether or not cracking occurs in the plugged honeycomb structure is examined. The test starts on condition that the quantity of accumulated soot is 4 g per one liter of honeycomb structure volume (hereunder referred to as 4 g/liter, for example), the quantity of accumulated soot is increased by 0.5 g/liter at a time, and the procedure is repeated until cracking is identified. The regeneration threshold value (the soot quantity at the initiation of cracking: g/liter) was obtained by averaging the measurement results of five honeycomb structures (N=5).

(Hot Vibration Test)

Vibration caused by an exhaust gas is imposed on a honeycomb structure in the axial direction thereof under the conditions of an inlet gas temperature of 900° C., a vibration acceleration of 50 G, and an oscillation frequency of 200 Hz while a heated exhaust gas is introduced into an exhaust gas purifier. A case where the movement (displacement) of a "honeycomb structure" after 300 hours is less than 0.2 mm is evaluated as excellent, a case where the movement is in the range of 0.2 to 0.4 mm is evaluated as good, and a case where the movement is in the range of 0.4 to 0.6 mm (0.4 mm is not included) is evaluated as acceptable. No practical problem occurs as long as the movement of an abutting face is 0.6 mm or less after a lapse of 300 hours but a preferable movement is 0.4 mm or less.

TABLE 1

| | W1 (mm) | W2 (mm) | t (mm) | T (mm) | Number of cells at outer peripheral thick portion | T/t | Isostatic strength (%) | Pressure loss (%) | Regeneration threshold value (g/liter) | Hot vibration test |
|---|---|---|---|---|---|---|---|---|---|---|
| Ex. 1 | 1.24 | 0.92 | 0.38 | 0.418 | 1 | 1.1 | +6 | 0 | 0 | — |
| Ex. 2 | 1.24 | 0.92 | 0.38 | 0.418 | 2 | 1.1 | +15 | +1 | 0 | — |
| Ex. 3 | 1.24 | 0.92 | 0.38 | 0.418 | 3 | 1.1 | +20 | +1 | +0.2 | — |
| Ex. 4 | 1.24 | 0.92 | 0.38 | 0.418 | 4 | 1.1 | +27 | +2 | +0.3 | — |
| Ex. 5 | 1.24 | 0.92 | 0.38 | 0.418 | 6 | 1.1 | +30 | +2 | +0.3 | — |
| Ex. 6 | 1.24 | 0.92 | 0.38 | 0.418 | 10 | 1.1 | +30 | +3 | +0.6 | — |
| Ex. 7 | 1.24 | 0.92 | 0.38 | 0.418 | 12 | 1.1 | +30 | +4 | +0.6 | — |
| Ex. 8 | 1.24 | 0.92 | 0.38 | 0.418 | 15 | 1.1 | +30 | +4 | +0.8 | — |
| Ex. 9 | 1.24 | 0.92 | 0.38 | 0.418 | 20 | 1.1 | +30 | +5 | +1.0 | — |
| Ex. 10 | 1.24 | 0.92 | 0.38 | 0.57 | 1 | 1.5 | +6 | 0 | 0 | — |
| Ex. 11 | 1.24 | 0.92 | 0.38 | 0.57 | 2 | 1.5 | +20 | +1 | +0.1 | — |
| Ex. 12 | 1.24 | 0.92 | 0.38 | 0.57 | 3 | 1.5 | +30 | +1 | +0.3 | — |
| Ex. 13 | 1.24 | 0.92 | 0.38 | 0.57 | 6 | 1.5 | +35 | +2 | +0.4 | — |
| Ex. 14 | 1.24 | 0.92 | 0.38 | 0.76 | 1 | 2.0 | +8 | 0 | +0.1 | — |
| Ex. 15 | 1.24 | 0.92 | 0.38 | 0.76 | 2 | 2.0 | +26 | +1 | +0.2 | — |
| Ex. 16 | 1.24 | 0.92 | 0.38 | 0.76 | 3 | 2.0 | +35 | +2 | +0.2 | — |

TABLE 1-continued

|  | W1 (mm) | W2 (mm) | t (mm) | T (mm) | Number of cells at outer peripheral thick portion | T/t | Isostatic strength (%) | Pressure loss (%) | Regeneration threshold value (g/liter) | Hot vibration test |
|---|---|---|---|---|---|---|---|---|---|---|
| Ex. 17 | 1.24 | 0.92 | 0.38 | 0.76 | 6 | 2.0 | +38 | +3 | +0.4 | — |
| Ex. 18 | 1.24 | 0.92 | 0.38 | 0.76 | 10 | 2.0 | +38 | +4 | +0.7 | — |
| Ex. 19 | 1.24 | 0.92 | 0.38 | 0.88 | 1 | 2.3 | +9 | 0 | +0.1 | — |
| Ex. 20 | 1.24 | 0.92 | 0.38 | 0.88 | 2 | 2.3 | +28 | +1 | +0.3 | — |

TABLE 2

|  | W1 (mm) | W2 (mm) | t (mm) | T (mm) | Number of cells at outer peripheral thick portion | T/t | H (mm) | D1 (mm) | D2 (mm) | T1 (mm) | T2 (mm) | Isostatic strength (%) | Pressure loss (%) | Regeneration threshold value (g/liter) | Hot vibration test |
|---|---|---|---|---|---|---|---|---|---|---|---|---|---|---|---|
| Ex. 21 | 1.24 | 0.92 | 0.38 | 0.88 | 3 | 2.3 | — | — | — | — | — | +38 | +2 | +0.3 | — |
| Ex. 22 | 1.24 | 0.92 | 0.38 | 0.88 | 6 | 2.3 | — | — | — | — | — | +40 | +2 | +0.5 | — |
| Ex. 23 | 1.24 | 0.92 | 0.38 | 0.88 | 10 | 2.3 | — | — | — | — | — | +40 | +4 | +.6 | — |
| Ex. 24 | 1.26 | 0.95 | 0.25 | 0.35 | 1 | 1.4 | — | — | — | — | — | +4 | 0 | 0 | — |
| Ex. 25 | 1.26 | 0.95 | 0.25 | 0.35 | 2 | 1.4 | — | — | — | — | — | +12 | 0 | 0 | — |
| Ex. 26 | 1.26 | 0.95 | 0.25 | 0.35 | 3 | 1.4 | — | — | — | — | — | +18 | +1 | +0.1 | — |
| Ex. 27 | 1.26 | 0.95 | 0.25 | 0.35 | 6 | 1.4 | — | — | — | — | — | +30 | +3 | +0.3 | — |
| Ex. 28 | 1.26 | 0.95 | 0.25 | 0.35 | 10 | 1.4 | — | — | — | — | — | +30 | +4 | +0.5 | — |
| Ex. 29 | 1.24 | 0.92 | 0.38 | 0.418 | 3 | 1.1 | — | 0.5 | 0.5 | 0.38 | 0.38 | +20 | +1 | +0.2 | Acceptable |
| Ex. 30 | 1.24 | 0.92 | 0.38 | 0.418 | 3 | 1.1 | 0.16 | 0.3 | 0.62 | 0.38 | 0.38 | +20 | +2 | +0.3 | Excellent |
| Ex. 31 | 1.24 | 0.92 | 0.38 | 0.418 | 3 | 1.1 | 0.18 | 0.1 | 0.46 | 0.4 | 0.38 | +21 | +2 | +0.3 | Excellent |
| Ex. 32 | 1.24 | 0.92 | 0.38 | 0.57 | 3 | 1.5 | 0.16 | 0.3 | 0.62 | 0.39 | 0.39 | +31 | +1 | +0.3 | Excellent |
| Ex. 33 | 1.24 | 0.92 | 0.38 | 0.57 | 3 | 1.5 | 0.16 | 0.5 | 0.82 | 0.76 | 0.76 | +32 | +2 | +0.4 | Excellent |
| Comp. Ex. 1 | 1.24 | 0.92 | 0.38 | — | 0 | — | — | — | — | — | — | — | — | — | — |
| Comp. Ex. 2 | 1.24 | 0.92 | 0.38 | 0.4 | 20 | 1.05 | — | — | — | — | — | +3 | +1 | 0 | — |
| Comp. Ex. 3 | 1.26 | 0.95 | 0.25 | — | 0 | — | — | — | — | — | — | — | — | — | — |
| Comp. Ex. 4 | 1.24 | 0.92 | 0.38 | — | 0 | — | 0 | 0.5 | 0.5 | 0.38 | 0.38 | — | — | — | Acceptable |

Examples 2 to 28, Comparative Examples 1 to 3

Honeycomb structures were produced in the same way as Example 1 except that the first cell width W1, the second cell width W2, the center section partition wall thickness t, the outer peripheral section partition wall thickness T, and the number of the cells at the outer peripheral thick portion were changed as shown in Tables 1 and 2. "Isostatic strength", "pressure loss", and "regeneration threshold value" were evaluated in the same way as Example 1. The results are shown in Tables 1 and 2. Here, "the number of the cells at the outer peripheral thick portion" means the number of the cells, except imperfect cells having partially chipped parts, having a thick partition wall at the outermost periphery of a honeycomb structure. The number of the cells having a thick partition wall (the cells formed with a thick partition wall) is the number of the cells aligned continuously from the outermost periphery toward the center of the honeycomb structure. That is, that the number of the cells at the outer peripheral thick portion is four means that the thickness of the partition wall forming the four cells, except imperfect cells at the outermost periphery, ranging from the outermost periphery to the center of the honeycomb structure is T over the whole periphery.

Example 29

Square honeycomb structures each side of which is 36 mm in length were produced by the method employed in Example 1. The obtained honeycomb structures were aligned so that four honeycomb structures were allocated vertically and horizontally respectively, then the side faces were bonded to each other with a bonding material, and thereby a honeycomb segment bonded body was obtained. As the bonding material, a mixture of aluminosilicate inorganic fiber and SiC particles was used. Here, the number of the cells in the outer peripheral thick portion was three in each of the honeycomb structures.

The outer periphery of the obtained honeycomb segment bonded body was ground and formed into a cylindrical shape. Thereafter a bonded type honeycomb structure 144 mm in diameter and 155 mm in length of the center axis direction having the structure shown in FIG. 3 was produced by applying outer periphery coating treatment and thus forming an outer peripheral coated portion on the outermost periphery of the honeycomb segment bonded body. As the outer periphery coating material, a mixture of inorganic fiber, colloidal silica, kneaded clay, SiC particles, an organic binder, a foamed resin, a dispersant, and water was used. In the obtained bonded type honeycomb structure, the distance between the honeycomb structures was 0.5 mm. In Table 2, they are shown in the columns D1 and D2. Further, the thickness of the outer peripheral walls of the honeycomb structures was 0.38 mm. In Table 2, they are shown in the columns T1 and T2. With regard to the obtained bonded type honeycomb structure, "isostatic strength", "pressure loss", and "regeneration threshold value" were evaluated in the same way as Example 1 and "hot vibration test" was carried out by the aforementioned method. The results are shown in Table 2.

Examples 30 to 33

Honeycomb structures were produced in the same way as Example 29 except that the shape of the outer peripheral wall was formed so that the portions conforming to the outer shapes of the first cells were formed into a convex shape and the portions conforming to the outer shapes of the second cells were formed into a concave shape as shown in FIG. 4B. After the honeycomb structures were produced, a bonded type honeycomb structure was produced in the same way as Example 29. The height H of the convex portions of the outer peripheral wall of the obtained bonded type honeycomb structure (the height H of the convex portions based on the concave portions) was 0.16 mm. Further, the distance D1 between the convex portions, the distance D2 between the concave portions, the partition wall thickness T1 of the convex portions, and the partition wall thickness T2 of the concave portions are shown in Table 2. With regard to the obtained bonded type honeycomb structure, "isostatic strength", "pressure loss", "regeneration threshold value", and "hot vibration test" were evaluated in the same way as Example 29. The results are shown in Table 2.

Comparative Example 4

A bonded type honeycomb structure was produced in the same way as Example 29 except that the partition wall thickness of the honeycomb structures was equalized to 0.38 mm. With regard to the obtained bonded type honeycomb structure, "isostatic strength", "pressure loss", "regeneration threshold value", and "hot vibration test" were evaluated in the same way as Example 29. The results are shown in Table 2.

From Tables 1 and 2, it is obvious that the honeycomb structures of Examples 1 to 28 show good results in the evaluations of the isostatic strength, the pressure loss, and the regeneration threshold value. In particular, good results were obtained in the evaluation of the isostatic strength. Further, it is obvious that the bonded type honeycomb structures of Examples 29 to 33 show good results in the evaluations of the isostatic strength, the pressure loss, the regeneration threshold value, and the hot vibration test. In particular, good results were obtained in the evaluation of the isostatic strength. Furthermore, the bonded type honeycomb structures of Examples 30 to 33 show very good results in the evaluation of the hot vibration test. In contrast, it is obvious that the honeycomb structures of Comparative examples 1 to 3 and the bonded type honeycomb structure of Comparative example 4 are inferior in the isostatic strength since the thickness of the partition walls in the outer peripheral sections is thin.

INDUSTRIAL APPLICABILITY

A method of manufacturing a honeycomb structure according to the present invention can preferably be used as a filter or a carrier for a catalytic device used for environmental protection and the recovery of specific materials in various industrial fields including chemical industry, electric power industry, and steel industry.

DESCRIPTION OF THE REFERENCE SYMBOLS

1: Cell
1a: First cell
1b: Second cell
2: Partition wall
3: Outer peripheral wall
3a: Convex portion
3b: Concave portion
4: One end face
5: The other end face
6: Plugged portion
11: Center section
12: Outer peripheral section
13: Boundary formed by points at the middle of the distance between a gravity center and an outer periphery
21: Bonding portion
22: Outer peripheral coated portion
100, 110: Honeycomb structure
200, 300: Bonded type honeycomb structure
O: Gravity center
H: Height of convex portion
D1: Distance between convex portions
D2: Distance between concave portions
W1: Width of first cell
W2: Width of second cell
t1: Partition wall thickness
t2: Thickness of oblique partition wall
T1: Partition wall thickness at convex portion
T2: Partition wall thickness at concave portion
T3: Thickness of oblique outer peripheral partition wall

What is claimed is:

1. A honeycomb structure comprising:
a porous partition wall defining a plurality of cells serving as fluid passages;
an outer peripheral wall located at the outermost periphery;
a first cell having one end opened and the other end plugged; and
a second cell having the one end plugged and the other end opened, wherein:
said first cells and said second cells are disposed alternately; and
an open area of said first cells is larger than that of said second cells in a cross section perpendicular to a center axis, and wherein
in a cross section perpendicular to the center axis, when the region from a center of gravity of an outer peripheral shape to a boundary formed by points at the middle of the distance between said center of gravity and the outer periphery of said outer peripheral wall is defined as a center section and the region outside said center section is defined as an outer peripheral section, the thickness of said partition wall that forms at least one cell from the outermost periphery in said outer peripheral section is 1.1 to 3.0 times the thickness of the partition wall in said center section,
wherein, in said outer peripheral wall of said honeycomb structure, the portions conforming to the outer shape of said first cells are formed into a convex shape and the portions conforming to the outer shape of said second cells are formed into a concave shape,
wherein a height of the portions formed into the convex shape with respect to the portions formed into the concave shape is in a range of 0.1 to 1.0 mm, and
wherein partition walls positioned directly between said second cells and said first cells have a straight shape for at least a length of the open area of said second cell.

2. The honeycomb structure according to claim 1, wherein the thickness of said partition wall that forms 20 cells or less from the outermost periphery in said outer peripheral section of said honeycomb structure is 1.1 to 3.0 times the thickness of the partition wall in said center section.

3. A honeycomb structure comprising
a plurality of the honeycomb structures according to claim 1, wherein said plurality of the honeycomb structures is disposed adjacently so that the side faces thereof face each other and said facing side faces are bonded together through bonding portions.

4. A honeycomb structure comprising
a plurality of the honeycomb structures according to claim 2, wherein
said plurality of the honeycomb structures is disposed adjacently so that the side faces thereof face each other and said facing side faces are bonded together through bonding portions.

5. The honeycomb structure according to claim 1, wherein a thickness of the outer peripheral wall is 0.2 to 1.5 mm.

\* \* \* \* \*